US012585086B2

(12) United States Patent
Wang et al.

(10) Patent No.: US 12,585,086 B2
(45) Date of Patent: Mar. 24, 2026

(54) CAMERA OPTICAL LENS

(71) Applicant: AAC Optics (Suzhou) Co., Ltd.,
Suzhou (CN)

(72) Inventors: Hongyu Wang, Suzhou (CN); Shunda Zhou, Suzhou (CN)

(73) Assignee: AAC Optics (Suzhou) Co., Ltd.,
Suzhou (CN)

( * ) Notice: Subject to any disclaimer, the term of this patent is extended or adjusted under 35 U.S.C. 154(b) by 327 days.

(21) Appl. No.: 18/399,621

(22) Filed: Dec. 28, 2023

(65) Prior Publication Data

US 2025/0013007 A1 Jan. 9, 2025

(30) Foreign Application Priority Data

Jul. 7, 2023 (CN) .......................... 202310830637.2

(51) Int. Cl.
*G02B 13/00* (2006.01)
*G02B 9/58* (2006.01)

(52) U.S. Cl.
CPC ............. *G02B 13/004* (2013.01); *G02B 9/58* (2013.01)

(58) Field of Classification Search
CPC ................................ G02B 13/004; G02B 9/58
See application file for complete search history.

(56) References Cited

U.S. PATENT DOCUMENTS

2014/0098432 A1* 4/2014 Kubota ..................... G02B 9/34
                                                                359/781
2014/0226222 A1* 8/2014 Hsieh ...................... G02B 13/04
                                                                359/781
2018/0011286 A1* 1/2018 Bone .................. G02B 27/0025
2024/0126045 A1* 4/2024 Yeh ..................... G02B 13/0065

* cited by examiner

*Primary Examiner* — James A Dudek
(74) *Attorney, Agent, or Firm* — Wiersch Law Group

(57) ABSTRACT

Provided is a camera optical lens, including first lens having negative refractive power, second lens having positive refractive power, third lens having positive refractive power, and fourth lens having negative refractive power, focal length of the camera optical lens is f, focal length of the first lens is f1, combined focal length of the third and fourth lenses is f34, on-axis thickness of the first lens is d1, on-axis distance between the first and second lenses is d2, total optical length of the camera optical lens is TTL, abbe number of the first lens is v1, following relational expressions are satisfied: $-30.00 \leq f1/d1 \leq -8.00$; $2.00 \leq TTL/f \leq 3.00$; $-2.30 \leq f34/f < -1.30$; $58.00 \leq v1 \leq 82.00$; $0.25 \leq d2/TTL \leq 0.45$. The camera optical lens has good optical performance, and is particularly suitable for mobile phone camera lens assembly, vehicle-mounted lens and WEB camera lens.

10 Claims, 12 Drawing Sheets

CAMERA OPTICAL LENS

TECHNICAL FIELD

The present disclosure relates to the field of optical lens and, in particular, to a camera optical lens applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of lightweight, thin and portable, the miniaturized camera optical lens with good imaging quality has become the mainstream of the current market. In order to obtain better imaging quality, a multi-lens structure is mostly used. In addition, with the development of technology and the increase of diversified needs of users, the pixel area of the optical sensor is continuously reduced and the requirements on the imaging quality of the system are improving, the structures with four lenses gradually appear in the lens design. There is an urgent need for a camera optical lens having good optical performance.

SUMMARY

In view of the above problems, an object of the present disclosure is to provide a camera optical lens having good optical performance.

In order to solve the above technical problem, an embodiment of the present disclosure provides a camera optical lens, including from an object-side to an image-side: a first lens having a negative refractive power, a second lens having a positive refractive power, a third lens having a positive refractive power, and a fourth lens having a negative refractive power; wherein, a focal length of the camera optical lens is f, a focal length of the first lens is f1, a combined focal length of the third lens and the fourth lens is f34, an on-axis thickness of the first lens is d1, an on-axis distance from an image-side surface of the first lens to an object-side surface of the second lens is d2, a total optical length from the object-side surface of the first lens to an image plane of the camera optical lens along an optic axis of the camera optical lens is TTL, an abbe number of the first lens is v1, and following relational expressions are satisfied: $-30.00 \le f1/d1 \le -8.00$; $2.00 \le TTL/f \le 3.00$; $-2.30 \le f34/f < -1.30$; $58.00 \le v1 \le 82.00$; and $0.25 \le d2/TTL \le 0.45$.

As an improvement, a central curvature radius of the object-side surface of the second lens is R3, a central curvature radius of the image-side surface of the second lens is R4, and a following relational expression is satisfied: $-6.00 \le R3/R4 \le -1.00$.

As an improvement, a focal length of the fourth lens is f4, an on-axis thickness of the fourth lens is d7, and a following relational expression is satisfied: $-3.00 \le f4/d7 \le -1.50$.

As an improvement, an object-side surface of the first lens is convex in a paraxial region, and an image-side surface of the first lens is concave in the paraxial region. A central curvature radius of an object-side surface of the first lens is R1, a central curvature radius of an image-side surface of the first lens is R2, and following relational expressions are satisfied:

$-5.50 \le f1/f \le -1.08$; $1.77 \le (R1+R2)/(R1-R2) \le 10.09$; and $0.02 \le d1/TTL \le 0.10$.

As an improvement, an object-side surface of the second lens is convex in a paraxial region, and an image-side surface of the second lens is convex in the paraxial region; a focal length of the second lens is f2, a central curvature radius of an object-side surface of the second lens is R3, a central curvature radius of an image-side surface of the second lens is R4, an on-axis thickness of the second lens is d3, and following relational expressions are satisfied: $0.29 \le f2/f \le 1.09$; $0 \le (R3+R4)/(R3-R4) \le 1.07$; and $0.02 \le d3/TTL \le 0.31$.

As an improvement, an object-side surface of the third lens is concave in a paraxial region; an image-side surface of the third lens is convex in the paraxial region; a focal length of the third lens is f3, a central curvature radius of an object-side surface of the third lens is R5, a central curvature radius of an image-side surface of the third lens is R6, an on-axis thickness of the third lens is d5, and following relational expressions are satisfied: $0.39 \le f3/f \le 1.87$; $0.65 \le (R5+R6)/(R5-R6) \le 2.73$; and $0.02 \le d5/TTL \le 0.09$.

As an improvement, an object-side surface of the fourth lens is concave in a paraxial region, an image-side surface of the fourth lens is concave in the paraxial region; a focal length of the fourth lens is f4, a central curvature radius of an object-side surface of the fourth lens is R7, a central curvature radius of an image-side surface of the fourth lens is R8, an on-axis thickness of the fourth lens is d7, and following relational expressions are satisfied:

$-1.32 \le f4/f \le -0.36$; $-1.31 \le (R7+R8)/(R7-R8) \le -0.06$; and $0.04 \le d7/TTL \le 0.27$.

As an improvement, the first lens, the second lens, the third lens and the fourth lens are made of glass.

As an improvement, a field of view of the camera optical in a diagonal lens is FOV, and a following relational expression is satisfied: $FOV \ge 46.18°$.

As an improvement, an image height of the camera optical lens is IH, and a following relational expression is satisfied: $TTL/IH \le 7.14$.

The present disclosure has the following beneficial effects: the camera optical lens as described in the present disclosure has good optical performance, and is particularly suitable for a mobile phone camera lens assembly, a vehicle-mounted lens and a WEB camera lens composed of camera elements such as CCD, CMOS with high definition.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to more clearly illustrate objectives, technical solutions, and advantages of Embodiments of the present disclosure, the technical solutions in Embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Embodiment 1

Figure 1:
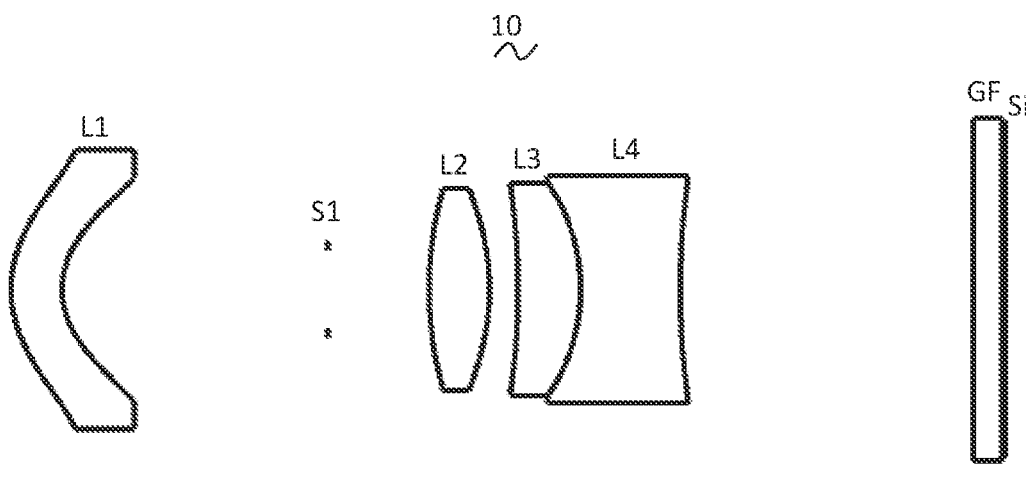
FIG. 1 is a structural schematic diagram of a camera optical lens according to Embodiment 1 of the present disclosure.

Referring to the drawings, the present disclosure provides a camera optical lens 10. FIG. 1 shows a camera optical lens 10 according to Embodiment 1 of the present disclosure, and the camera optical lens 10 includes a total of 4 lenses. The camera optical lens 10 includes from an object side to an image side: a first lens L1, an aperture S1, a second lens L2, a third lens L3, and the fourth lens L4. An optical element such as a grating filter GF may be provided between the fourth lens L5 and the image plane Si.

In this embodiment, the first lens L1, the second lens L2, the third lens L3, and the fourth lens L4 are made of glass, and proper selection of glass lenses can improve the optical performance of the camera optical lens. In other alternative embodiments, each lens may also be made of other materials.

A focal length of the first lens L1 is defined as f1, and an on-axis thickness of the first lens L1 is defined as d1, a following relational expression is satisfied: $-30.00 \leq f1/d1 \leq -8.00$, when f1/d1 satisfies the relational expression, it helps to buffer variations of the incident angle of light, so that the light is smoothly transmitted in the camera optical lens 10, while maintaining the refractive power intensity of the first lens L1, to improve chromatic aberration and improve image quality, so that $|LC| \leq 5.0 \ \mu m$.

A focal length of the camera optical lens 10 is defined as f and the total optical length from the object side surface of the first lens to an image plane of the camera optical lens 10 along an optic axis of the camera optical lens 10 is defined as TTL, a following relational expression is satisfied: $2.00 \leq TTL/f \leq 3.00$, which specifies the ratio of the TTL to the focal length f, and effectively controls the length of the camera optical lens 10 within the range of the relational expression.

A combined focal length of the third lens L3 and the fourth lens L4 is defined as f34, a following relational expression is satisfied: $-2.30 \leq f34/f < -1.30$, which specifies the ratio of the combined focal length f34 of the third lens L3 and the fourth lens L4 to the focal length of the camera optical lens 10. Within the range of the relational expression, so that it is able to control the light path after the second lens L2, and reduce aberration caused by large-angle light, and meanwhile, the lens structure is more compact.

An abbe number of the first lens L1 is defined as v1, and a following relational expression is satisfied: $58.00 \leq v1 \leq 82.00$, which specifies the abbe number of the first lens L1, and within the range of the relational expression, material properties can be effectively distributed to improve aberration and improve imaging quality.

An on-axis distance from an image-side surface of the first lens L1 to an object-side surface of the second lens L2 is d2, a following relational expression is satisfied: $0.25 \leq d2/TTL \leq 0.45$. Within the range of the relational expression, the distance between the two lenses at the diaphragm is large, the smooth transition of light near the diaphragm can be ensured within the total optical length, and the image quality can be improved.

A central curvature radius of an object-side surface of the second lens L2 is defined as R3, and a central curvature radius of an image-side surface of the second lens L2 is defined as R4, a following relational expression is satisfied: $-6.00 \leq R3/R4 \leq -1.00$. Within the range of the relational expression, it is beneficial to reduce the deflection of light passing through the lens, and the field curvature of the camera optical lens 10 may be effectively balanced, so that the field curvature offset of the central field of view is smaller than 0.025 mm.

A focal length of the fourth lens L4 is defined as f4, and an on-axis thickness of the fourth lens L4 is defined as d7, a following relational expression is satisfied: $-3.00 \leq f4/d7 \leq -1.50$. Within the range of the relational expression, it is helpful for the fourth lens L4 to maintain a negative refractive power with sufficient intensity to correct off-axis aberration at the image-side surface, and meanwhile, the thickness of the fourth lens L4 can be effectively controlled to reduce cost.

In this embodiment, an object-side surface of the first lens L1 is convex in a paraxial region, an image-side surface of the first lens L1 is concave in the paraxial region, and the first lens L1 has a negative refractive power. In other optional embodiments, the object-side surface and the image-side surface of the first lens L1 may also be provided with other concave and convex distributions.

The camera optical lens 10 further satisfies the following relational expression: $-5.50 \leq f1/f \leq -1.08$, which specifies the ratio of the focal length f1 of the first lens L1 to the focal length f of the camera optical lens 10, and in this range, it is beneficial to achieve ultra-wide-angle. Optionally, a following relational expression is satisfied: $-3.44 \leq f1/f \leq -1.34$.

A central curvature radius of an object-side surface of the first lens L1 is defined as R1, a central curvature radius of an image-side surface of the first lens L2 is defined as R2, a following relational expression is satisfied: $1.77 \leq (R1+R2)/(R1-R2) \leq 10.09$ specifies a shape of the first lens L1, and in this range, it is beneficial to achieve ultra-wide-angle. Optionally, a following relational expression is satisfied: $2.83 \leq (R1+R2)/(R1-R2) \leq 8.07$.

The camera optical lens 10 further satisfies a following relational expression: $0.02 \leq d1/TTL \leq 0.10$, within the range of the relational expression, it is beneficial to achieve miniaturization. Optionally, a following relational expression is satisfied: $0.03 \leq d1/TTL \leq 0.08$.

In this embodiment, an object-side surface of the second lens L2 is convex in a paraxial region, an image-side surface of the second lens L2 is convex in the paraxial region, and the second lens L2 has a positive refractive power. In other optional embodiments, the object-side surface and the image-side surface of the second lens L2 may also be provided with other concave and convex distributions.

In this embodiment, a focal length of the second lens L2 is f2, and a following relational expression is satisfied: $0.29 \leq f2/f \leq 1.09$, which specifies the ratio of the focal length f2 of the second lens L2 to the focal length of the camera optical lens 10, and in this range, the field curvature of the system can be effectively balanced. Optionally, a following relational expression is satisfied: $0.47 \leq f2/f \leq 0.88$.

The camera optical lens 10 further satisfies a following relational expression: $0 \leq (R3+R4)/(R3-R4) \leq 1.07$, which specifies the shape of the second lens L2, and in this range, it is beneficial to achieve ultra-wide angle. Optionally, a following relational expression is satisfied: $0 \leq (R3+R4)/(R3-R4) \leq 0.86$.

An on-axis thickness of the second lens L2 is d3, and a following relational expression is satisfied: $0.02 \leq d3/TTL \leq 0.31$. Within the range of the relational expression, it is beneficial to achieve miniaturization. Optionally, a following relational expression is satisfied: $0.03 \leq d3/TTL \leq 0.25$.

An object-side surface of the third lens L3 is concave in a paraxial region, an image-side surface of the third lens L3 is convex in the paraxial region, and the third lens L3 has a positive refractive power. In other optional embodiments, the object-side surface and the image-side surface of the third lens L3 may also be provided with other concave and convex distributions.

A focal length of the third lens L3 is f3, a following relational expression is satisfied: $0.39 \leq f3/f \leq 1.87$, the system has better imaging quality and lower sensitivity through reasonable distribution of refractive power. Optionally, a following relational expression is satisfied: $0.63 \leq f3/f \leq 1.50$.

A central curvature radius of an object-side surface of the third lens L3 is R5, and a central curvature radius of an image-side surface of the third lens L3 is R6, a following relational expression is satisfied: $0.65 \leq (R5+R6)/(R5-R6) \leq 2.73$, which specifies the shape of the third lens L3, and in this range, it can reduce the deflection of light and effectively correct the chromatic aberration. Optionally, a following relational expression is satisfied: $1.03 \leq (R5+R6)/(R5-R6) \leq 2.18$.

An on-axis thickness of the third lens L3 is d5, a following relational expression is satisfied: $0.02 \leq d5/TTL \leq 0.09$. Within the range of the relational expression, it is beneficial to achieve miniaturization. Optionally, a following relational expression is satisfied: $0.03 \leq d5/TTL \leq 0.08$.

In this embodiment, an object-side surface of the fourth lens L4 is concave in a paraxial region, an image-side surface of the fourth lens L4 is concave in the paraxial region, and the fourth lens L4 has a negative refractive power. In other optional embodiments, the object-side surface and the image-side surface of the fourth lens L4 may also be provided with other concave and convex distributions.

A focal length of the fourth lens L4 is f4, a following relational expression is satisfied: $-1.32 \leq f4/f \leq -0.36$, the system has better imaging quality and lower sensitivity through reasonable distribution of refractive power. Optionally, a following relational expression is satisfied: $-0.83 \leq f4/f \leq -0.45$.

An on-axis thickness of the fourth lens L4 is d7, a following relational expression is satisfied: $0.04 \leq d7/TTL \leq 0.27$. Within the range of the relational expression, it is beneficial to achieve miniaturization. Optionally, a following relational expression is satisfied:

$$0.07 \leq d7/TTL \leq 0.21.$$

In this embodiment, the field of view of the camera optical lens 10 in a diagonal direction is defined as FOV, a following relational expression is satisfied: $FOV \geq 46.18°$, which is beneficial to achieve wide-angle. Optionally, a following relational expression is satisfied: $FOV \geq 46.65°$.

In this embodiment, an image height of the camera optical lens 10 is IH, and a following relational expression is satisfied: $TTL/IH \leq 7.14$, which is beneficial to achieve miniaturization. Optionally, a following relational expression is satisfied: $TTL/IH \leq 6.94$.

In this embodiment, an f-number of the camera optical lens 10 FNO is smaller than or equal to 16.43, thereby achieving a large-aperture and having good imaging performance. Optionally, an f-number of the camera optical lens 10 FNO is smaller than or equal to 16.11.

The camera optical lens 10 has good optical performance, and the camera optical lens 10 is particularly suitable for a vehicle-mounted lens, a mobile phone camera lens assembly and a WEB camera lens which are composed of camera elements such as CCD and CMOS with high definition.

The camera optical lens 10 of the present disclosure will be described below by way of example. The reference signs recited in each example are shown below. The units of the focal length, the on-axis distance, the central curvature radius, the on-axis thickness, the inflection point position, and the arrest point position are mm.

TTL: total optical length from the object side surface of the first lens to an image plane of the camera optical lens 10 along an optic axis (the on-axis distance from the object-side surface of the first lens L1 to the image plane Si), in mm.

F-number FNO: refers to a ratio of the effective focal length of the camera optical lens 10 to the entrance pupil diameter of the camera optical lens 10.

Optionally, the object-side surface and/or the image-side surface of the lens may be further provided with an inflection point and/or an arrest point, so as to meet high-quality imaging requirements, specific implementable embodiments are described below.

Table 1 and Table 2 show design data of the camera optical lens 10 according to Embodiment 1 of the present disclosure.

TABLE 1

|  | R |  | d |  | nd |  | vd |
| --- | --- | --- | --- | --- | --- | --- | --- |
| S1 | ∞ | d0= | −9.554 |  |  |  |  |
| R1 | 3.800 | d1= | 1.534 | nd1 | 1.4969 | v1 | 81.52 |
| R2 | 2.553 | d2= | 11.074 |  |  |  |  |
| R3 | 11.293 | d3= | 1.824 | nd2 | 1.6192 | v2 | 63.85 |
| R4 | −7.641 | d4= | 0.862 |  |  |  |  |
| R5 | −22.804 | d5= | 1.893 | nd3 | 1.8040 | v3 | 76.62 |
| R6 | −6.117 | d6= | 0.000 |  |  |  |  |
| R7 | −6.117 | d7= | 2.998 | nd4 | 1.6989 | v4 | 30.05 |
| R8 | 24.974 | d8= | 8.834 |  |  |  |  |
| R9 | ∞ | d9= | 0.900 | ndg | 1.5168 | vg | 64.21 |
| R10 | ∞ | d10= | 0.081 |  |  |  |  |

The meaning of each reference sign is as follows.

S1: aperture;

R: curvature radius of the center of the optical surface;

R1: central curvature radius of the object-side surface of the first lens L1;

R2: central curvature radius of the image-side surface of the first lens L1;

R3: central curvature radius of the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the grating filter GF;

d9: on-axis thickness of the grating filter GF;

d10: on-axis distance from the image-side surface of the grating filter GF to the image plane Si;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

vg: abbe number of the grating filter GF.

Table 2 shows aspheric surface data of each lens in the camera optical lens 10 according to Embodiment 1 of the present disclosure.

TABLE 2

| | Conic Coefficient | Aspheric Coefficient | | | | | |
| --- | --- | --- | --- | --- | --- | --- | --- |
| | k | A4 | A6 | A8 | A10 | A12 | A14 |
| R1 | −5.3067E−01 | −1.5941E−03 | 8.5255E−06 | −1.3595E−05 | 7.5269E−07 | −1.7538E−08 | 1.1111E−10 |
| R2 | −6.1143E−01 | −2.7294E−03 | 5.0415E−05 | −7.0192E−05 | 6.1402E−06 | −2.5268E−07 | 2.2120E−09 |
| R3 | −1.7096E+00 | −1.7174E−04 | 9.6406E−06 | 7.1006E−09 | 5.4168E−07 | −9.3055E−08 | 5.7578E−09 |
| R4 | −3.1265E+00 | −4.0643E−04 | 3.9021E−05 | −8.1945E−06 | 1.9513E−06 | −2.0800E−07 | 9.1076E−09 |

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the grating filter GF;

R10: central curvature radius of the image-side surface of the grating filter GF;

d: on-axis thickness of lenses, on-axis distance between lenses;

d0: on-axis distance from the aperture S1 to the object-side surface of the first lens L1;

d1: an on-axis thickness of the first lens L1;

d2: on-axis distance from the image-side surface of the first lens L1 to the object-side surface of the second lens L2;

For convenience, the aspheric surface of each lens surface uses the aspheric surface shown in the following formula (1). However, the present disclosure is not limited to the aspheric polynomial form shown in formula (1).

$$z = (cr^2)/\left\{1 + \left[1 - (k+1)(c^2r^2)\right]^{1/2}\right\} + A4r^4 + \tag{1}$$

$$A6r^6 + A8r^8 + A10r^{10} + A12r^{12} + A14r^{14} + A16r^{16}$$

In the above formula (1), k is the conic coefficient, A4, A6, A8, A10, A12, A14 are the aspheric coefficients, c is the curvature at the center of the optical surface, r is the vertical distance between the point on the curve of the aspheric surface and the optical axis, and z is the aspheric depth (the vertical distance between the point on the aspheric surface with distance r from the optical axis and the tangent plane tangent to the vertex on the optical axis of aspheric axis).

The corresponding data in the column "arrest point position" is a vertical distance from the arrest point provided with the surface of each lens to the optical axis of the camera optical lens 10.

Figure 2:
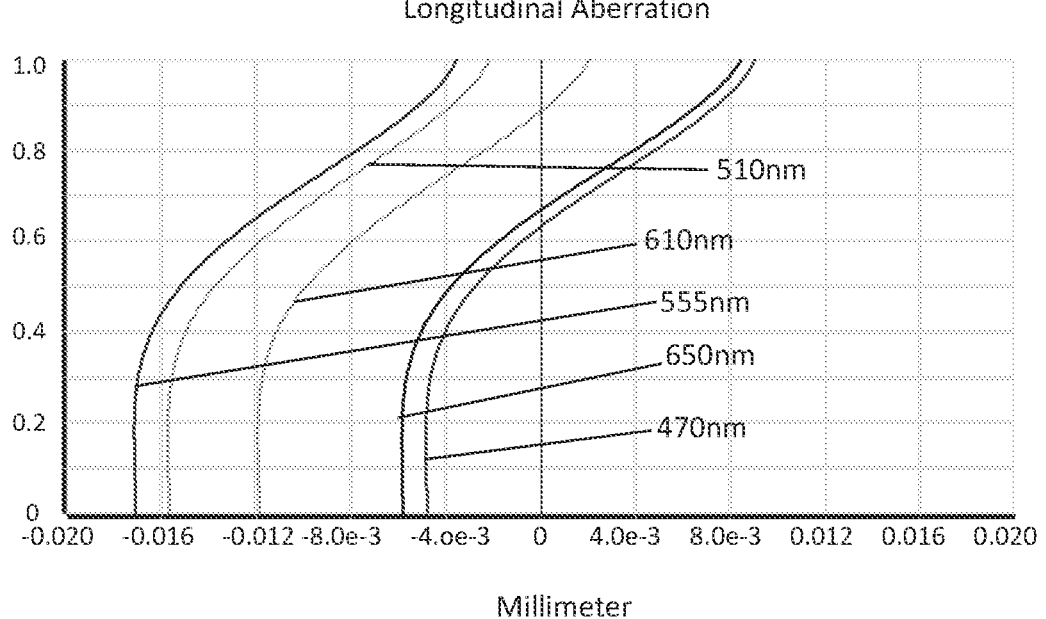
FIG. 2 is a schematic diagram of longitudinal aberration of the camera optical lens shown in FIG. 1.
Figure 3:
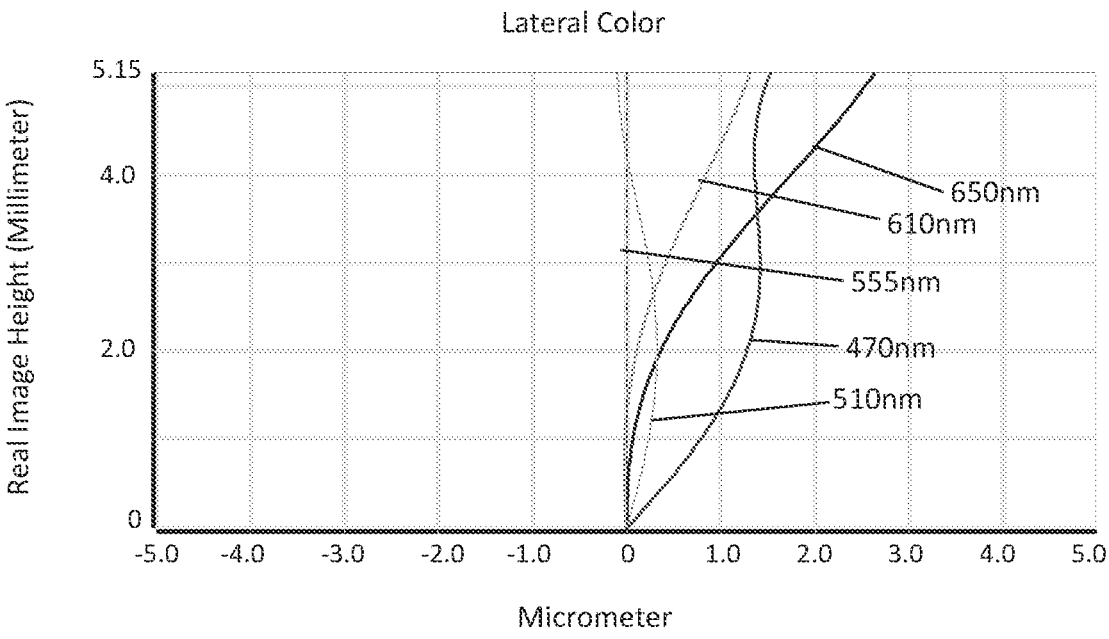
FIG. 3 is a schematic diagram of lateral color of the camera optical lens shown in FIG. 1.
Figure 4:
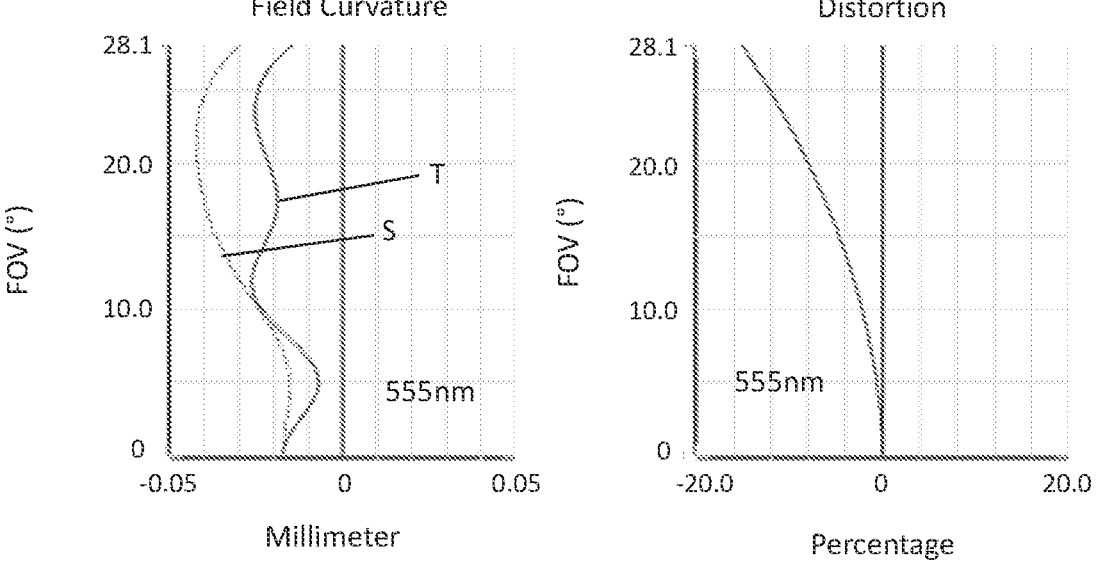
FIG. 4 is a schematic diagram of field curvature and distortion of the camera optical lens shown in FIG. 1.

FIG. 2 and FIG. 3 respectively show longitudinal aberration and lateral color of light with wavelengths of 650 nm, 610 nm, 555 nm, 510 nm, 470 nm, and 435 nm after passing through the camera optical lens 10 according to Embodiment 1. FIG. 4 shows field curvature and distortion of light with a wavelength of 555 nm after passing through the camera optical lens 10 according to Embodiment 1, the field curvature S in FIG. 4 is a field curvature in a sagittal direction, and T is a field curvature in a meridian direction.

Table 16 appearing later shows various values in each embodiment and values corresponding to the parameters specified in the relational expressions.

As shown in Table 16, Embodiment 1 satisfies each relational expression.

In this embodiment, the entrance pupil diameter ENPD of the camera optical lens 10 is 2.194 mm, the full field of view image height IH is 10.29 mm, and the field of view FOV in a diagonal direction is 56.17°, the camera optical lens 10 has good optical performance, its on-axis and off-axis chromatic aberrations are fully corrected.

Embodiment 2

Embodiment 2 is substantially the same as Embodiment 1, and the reference signs have the same meaning as Embodiment 1, and only differences are listed below.

Figure 5:
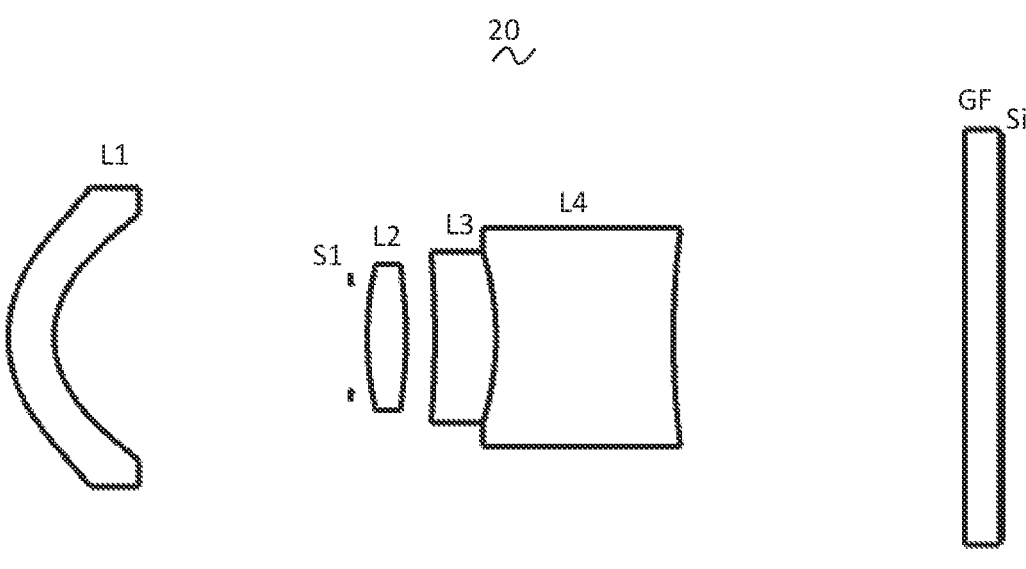
FIG. 5 is a structural schematic diagram of a camera optical lens according to Embodiment 2 of the present disclosure.

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

|  | R |  | d |  | nd |  | vd |
|---|---|---|---|---|---|---|---|
| S1 | ∞ | d0= | −8.922 |  |  |  |  |
| R1 | 3.117 | d1= | 1.200 | nd1 | 1.4969 | v1 | 81.52 |
| R2 | 2.310 | d2= | 8.162 |  |  |  |  |
| R3 | 9.232 | d3= | 1.000 | nd2 | 1.6192 | v2 | 63.85 |
| R4 | −9.174 | d4= | 0.748 |  |  |  |  |
| R5 | −24.206 | d5= | 1.592 | nd3 | 1.8040 | v3 | 46.57 |
| R6 | −7.037 | d6= | 0.000 |  |  |  |  |
| R7 | −7.037 | d7= | 4.633 | nd4 | 1.6989 | v4 | 30.05 |
| R8 | 20.779 | d8= | 7.590 |  |  |  |  |
| R9 | ∞ | d9= | 0.900 | ndg | 1.5168 | vg | 64.21 |
| R10 | ∞ | d10= | 0.081 |  |  |  |  |

Table 4 shows aspheric surface data of each lens in the camera optical lens 20 according to Embodiment 2 of the present disclosure.

Table 5 shows design data of inflection points of each lens in the camera optical lens 20 according to the Embodiment 2 of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4. The corresponding data in the column "inflection point position" is the vertical distance from the inflection point provided with the surface of each lens to the optical axis of the camera optical lens 20.

TABLE 5

|  | Number of inflection points | Inflection point position 1 | Inflection point position 2 |
|---|---|---|---|
| P1R1 | 1 | 3.135 | / |
| P1R2 | 1 | 3.105 | / |
| P2R1 | 0 | / | / |
| P2R2 | 1 | 1.315 | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |

Figure 6:
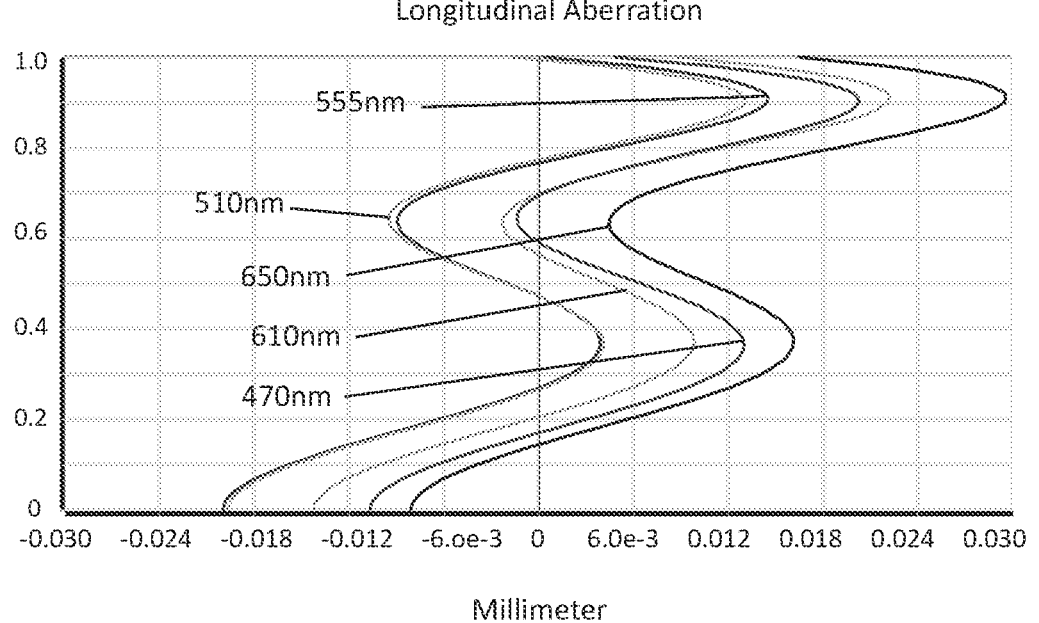
FIG. 6 is a schematic diagram of longitudinal aberration of the camera optical lens shown in FIG. 5.
Figure 7:
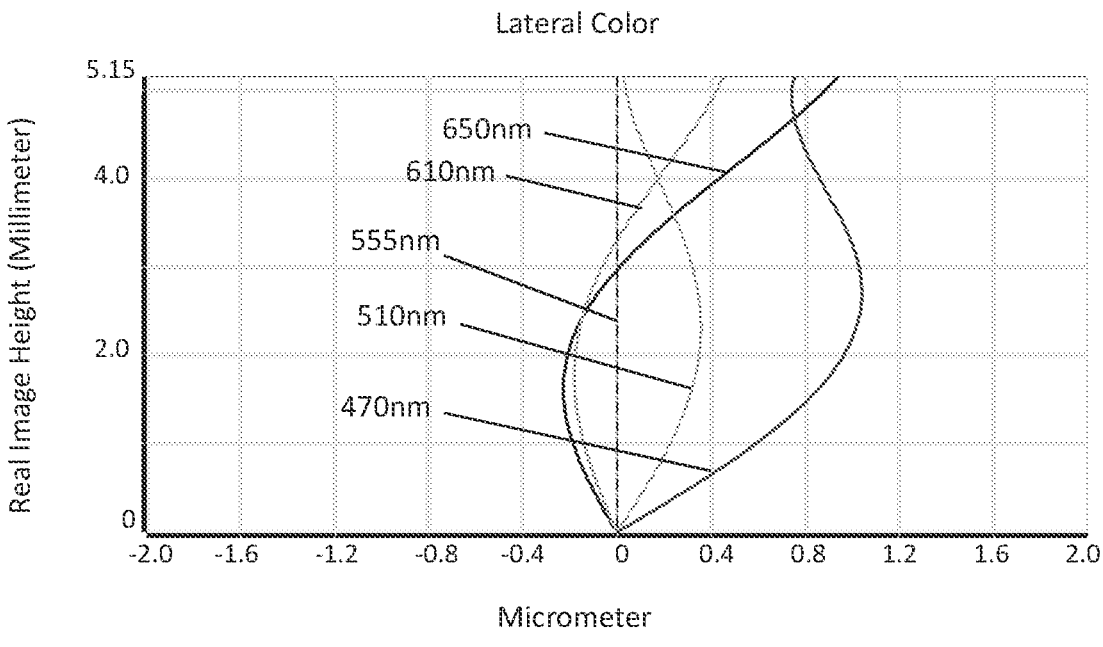
FIG. 7 is a schematic diagram of lateral color of the camera optical lens shown in FIG. 5.
Figure 8:
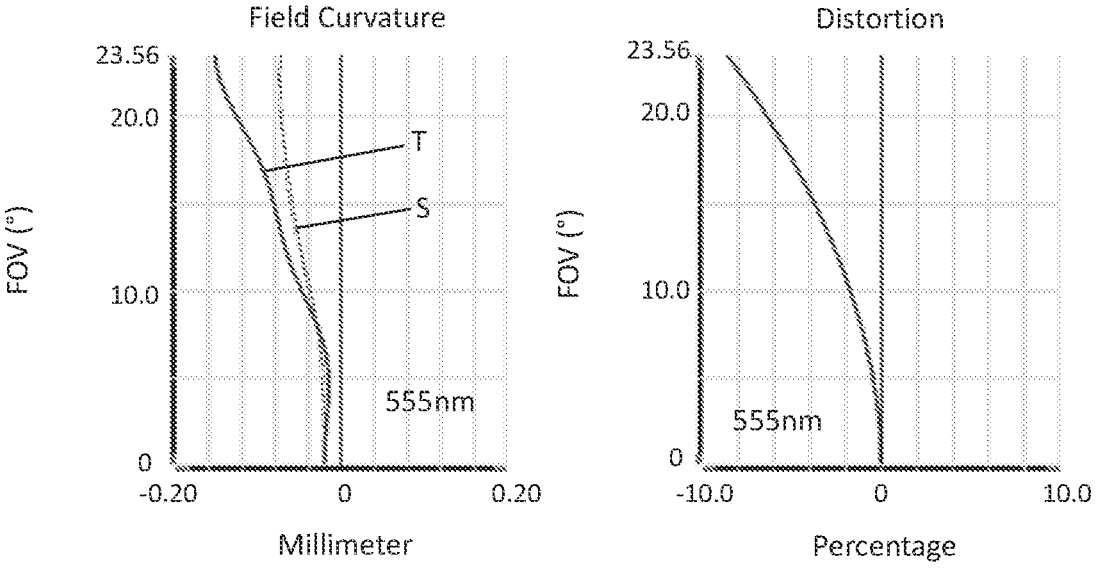
FIG. 8 is a schematic diagram of field curvature and distortion of the camera optical lens shown in FIG. 5.

FIG. 6 and FIG. 7 respectively show longitudinal aberration and lateral color of light with wavelengths of 650 nm, 610 nm, 555 nm, 510 nm, 470 nm, and 435 nm after passing through the camera optical lens 20 according to Embodiment 2. FIG. 8 shows field curvature and distortion of light with a wavelength of 555 nm after passing through the camera optical lens 20 according to Embodiment 2. The field curvature S in FIG. 8 is the field curvature in a sagittal direction, and T is the field curvature in a meridian direction.

As shown in Table 16, Embodiment 2 satisfies each relational expression.

In this embodiment, the entrance pupil diameter ENPD of the camera optical lens 20 is 2.493 mm, the full field of view image height IH is 5.145 mm, and the field of view FOV in a diagonal direction is 47.12°, the camera optical lens 20 has good optical performance, its on-axis and off-axis chromatic aberrations are fully corrected.

Embodiment 3

Embodiment 3 is substantially the same as Embodiment 1, and the reference signs have the same meaning as Embodiment 1, and only differences are listed below.

Figure 9:
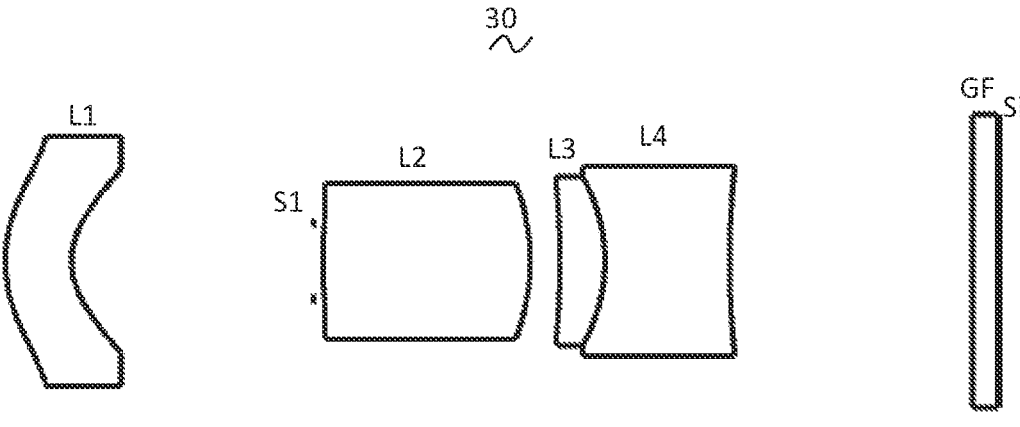
FIG. 9 is a structural schematic diagram of a camera optical lens according to Embodiment 3 of the present disclosure.

FIG. 9 shows a camera optical lens 30 according to Embodiment 3 of the present disclosure.

TABLE 4

| Conic Coefficient | | Aspheric Coefficient | | | | | |
|---|---|---|---|---|---|---|---|
| | k | A4 | A6 | A8 | A10 | A12 | A14 |
| R1 | −6.2823E−01 | −1.0076E+00 | −2.4362E−01 | −9.7846E−03 | 3.7351E−03 | −1.2238E−03 | −7.1811E−04 |
| R2 | −6.2401E−01 | −6.0832E−01 | −1.7893E−01 | −2.2509E−02 | −2.3827E−03 | −1.2494E−03 | −4.8001E−04 |
| R3 | 7.8015E+00 | 1.6717E−01 | −3.2742E−02 | −1.5805E−02 | 2.1482E−02 | 1.8417E−02 | 5.2911E−03 |
| R4 | −4.3968E+01 | 5.6126E−01 | 1.3013E−01 | −3.8350E−02 | −5.2539E−03 | 8.2971E−03 | 4.3377E−03 |

Table 6 and Table 7 show design data of the camera optical lens 30 according to the Embodiment 3 of the present disclosure.

TABLE 6

|  | R |  | d |  | nd |  | vd |
| --- | --- | --- | --- | --- | --- | --- | --- |
| S1 | ∞ | d0= | −10.865 |  |  |  |  |
| R1 | 4.544 | d1= | 2.348 | nd1 | 1.4969 | v1 | 81.52 |
| R2 | 2.543 | d2= | 8.819 |  |  |  |  |
| R3 | 12.748 | d3= | 7.307 | nd2 | 1.6192 | v2 | 63.85 |
| R4 | −7.167 | d4= | 1.044 |  |  |  |  |
| R5 | −27.757 | d5= | 1.580 | nd3 | 1.8040 | v3 | 46.57 |
| R6 | −6.030 | d6= | 0.000 |  |  |  |  |
| R7 | −6.030 | d7= | 4.390 | nd4 | 1.6989 | v4 | 30.05 |
| R8 | 29.086 | d8= | 8.527 |  |  |  |  |
| R9 | ∞ | d9= | 0.900 | ndg | 1.5168 | vg | 64.21 |
| R10 | ∞ | d10= | 0.081 |  |  |  |  |

Table 7 shows aspheric surface data of each lens in the camera optical lens 30 as described in Embodiment 3 of the present disclosure.

TABLE 7

| Conic Coefficient | | Aspheric Coefficient | | | | | |
| --- | --- | --- | --- | --- | --- | --- | --- |
|  | k | A4 | A6 | A8 | A10 | A12 | A14 |
| R1 | −5.0968E−01 | −8.0910E−01 | −4.0391E−02 | 5.3699E−03 | 7.8907E−05 | −2.5779E−04 | 2.3640E−05 |
| R2 | −6.7107E−01 | −7.9294E−01 | −4.9375E−02 | 1.6252E−03 | −7.9537E−04 | −3.1117E−04 | 3.7860E−05 |
| R3 | 2.2357E+01 | 2.7779E−02 | 1.8648E−02 | −3.0365E−02 | −7.2117E−03 | 8.7078E−03 | 4.2639E−03 |
| R4 | −2.8608E+00 | −3.2067E−02 | 2.8929E−03 | −5.4134E−05 | 1.5407E−04 | −9.1415E−07 | 2.6122E−05 |

Figure 10:
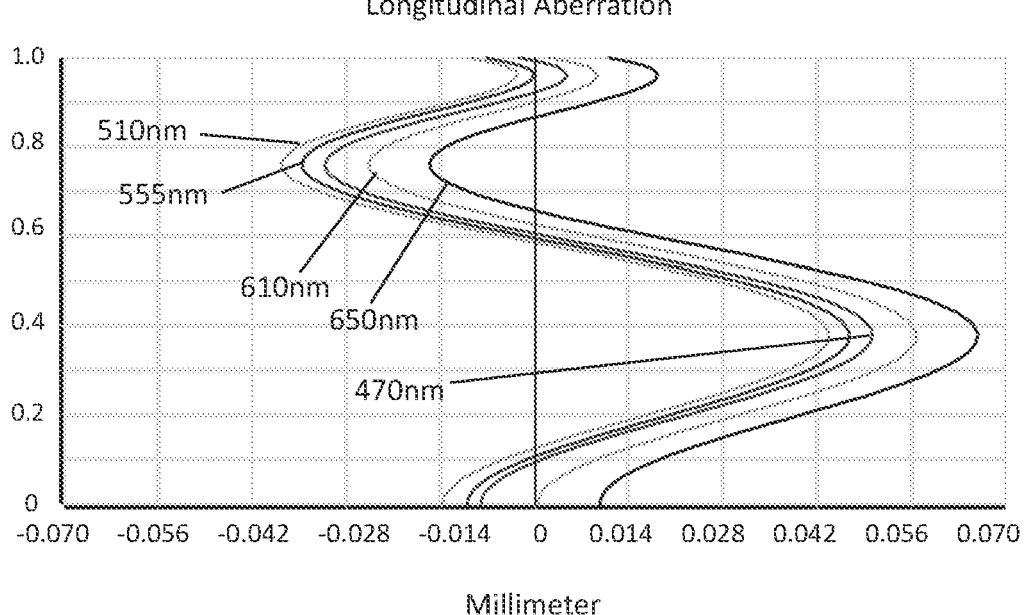
FIG. 10 is a schematic diagram of longitudinal aberration of the camera optical lens shown in FIG. 9.
Figure 11:
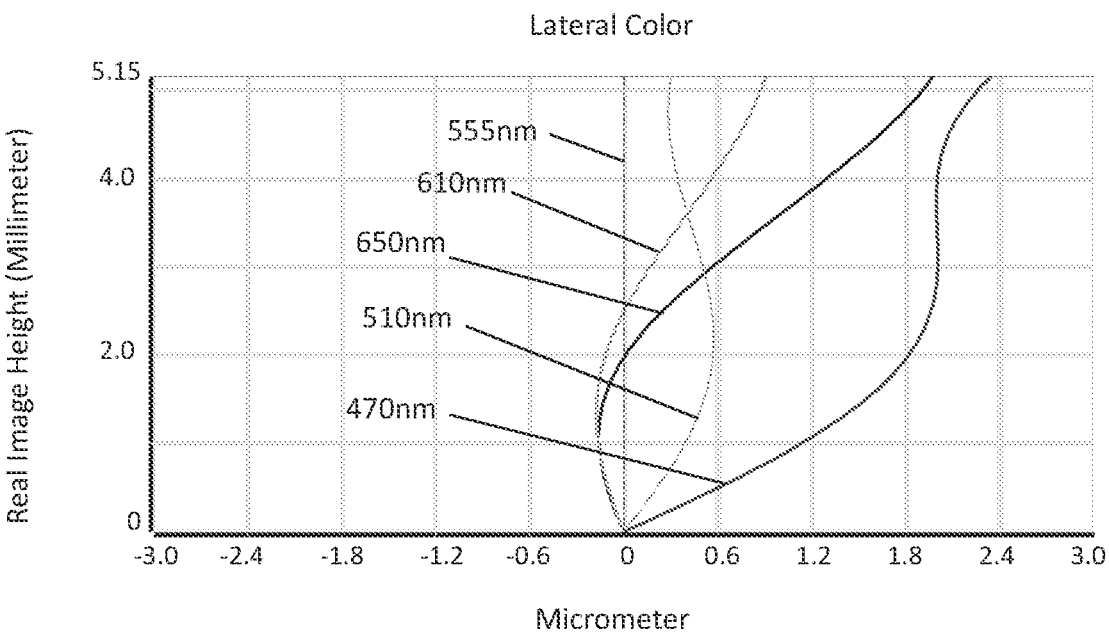
FIG. 11 is a schematic diagram of lateral color of the camera optical lens shown in FIG. 9.
Figure 12:
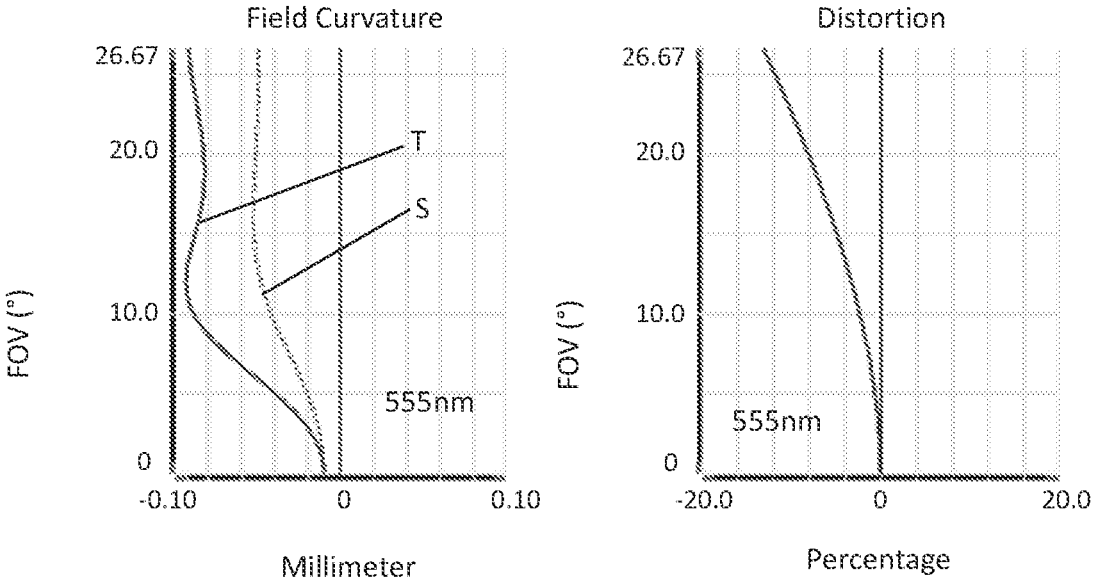
FIG. 12 is a schematic diagram of field curvature and distortion of the camera optical lens shown in FIG. 9.

FIG. 10 and FIG. 11 show longitudinal aberration and lateral color of light with wavelengths of 650 nm, 610 nm, 555 nm, 510 nm, 470 nm, and 435 nm after passing through the camera optical lens 30 according to Embodiment 3. FIG. 12 shows field curvature and distortion of light with a wavelength of 555 nm after passing through the camera optical lens 30 according to Embodiment 3. The field curvature S in FIG. 12 is the field curvature in a sagittal direction, and T is the field curvature in a meridian direction.

The following Table 16 lists values corresponding to each relational expression in this embodiment according to the above relational expressions. It is apparent that, the camera optical lens 30 of the present embodiment satisfies the above relational expressions.

In this embodiment, the entrance pupil diameter ENPD of the camera optical lens 30 is 0.739 mm, the full field of view image height IH is 5.145 mm, and the field of view FOV in a diagonal direction is 110.33°, the camera optical lens 30 has good optical performance, its on-axis and off-axis chromatic aberrations are fully corrected.

Embodiment 4

Embodiment 4 is substantially the same as Embodiment 1, and the reference signs have the same meaning as Embodiment 1, and only differences are listed below.

Figure 13:
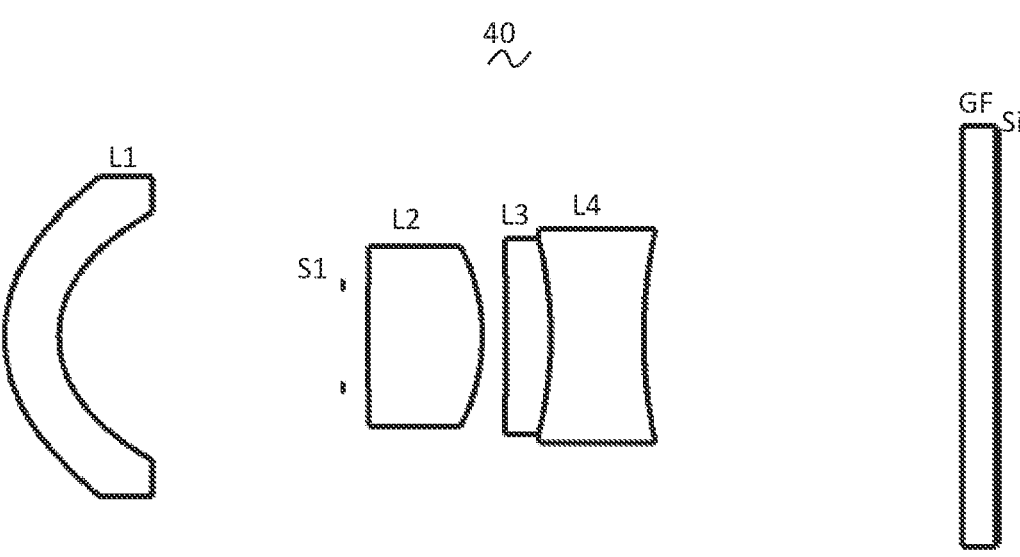
FIG. 13 is a structural schematic diagram of a camera optical lens according to Embodiment 4 of the present disclosure.

FIG. 13 shows a camera optical lens 40 according to Embodiment 4 of the present disclosure.

Table 8 and Table 9 show design data of the camera optical lens 40 according to Embodiment 4 of the present disclosure.

TABLE 8

|  | R |  | d |  | nd |  | vd |
| --- | --- | --- | --- | --- | --- | --- | --- |
| S1 | ∞ | d0= | −10.016 |  |  |  |  |
| R1 | 3.645 | d1= | 1.443 | nd1 | 1.5182 | v1 | 58.96 |
| R2 | 2.497 | d2= | 8.212 |  |  |  |  |
| R3 | 29.245 | d3= | 3.063 | nd2 | 1.6192 | v2 | 63.85 |
| R4 | −4.898 | d4= | 0.630 |  |  |  |  |
| R5 | −77.708 | d5= | 1.200 | nd3 | 1.8040 | v3 | 46.57 |

TABLE 8-continued

|  | R |  | d |  | nd |  | vd |
| --- | --- | --- | --- | --- | --- | --- | --- |
| R6 | −9.853 | d6= | 0.000 |  |  |  |  |
| R7 | −9.853 | d7= | 2.471 | nd4 | 1.6989 | v4 | 30.05 |
| R8 | 11.952 | d8= | 8.490 |  |  |  |  |
| R9 | ∞ | d9= | 0.900 | ndg | 1.5168 | vg | 64.21 |
| R10 | ∞ | d10= | 0.081 |  |  |  |  |

Table 9 shows aspheric surface data of each lens in the camera optical lens 40 according to Embodiment 4 of the present disclosure.

TABLE 9

| Conic Coefficient | | Aspheric Coefficient | | | | | |
| --- | --- | --- | --- | --- | --- | --- | --- |
|  | k | A4 | A6 | A8 | A10 | A12 | A14 |
| R1 | −5.0666E−01 | −3.6816E−01 | −9.0685E−02 | −1.6811E−02 | 1.7931E−05 | −3.4532E−04 | 1.8945E−04 |
| R2 | −5.9480E−01 | −1.0207E−01 | −4.9256E−02 | −1.4211E−02 | −3.4135E−04 | −3.9308E−04 | 3.4906E−04 |
| R3 | −1.5016E+02 | −1.5338E−01 | −7.4598E−03 | 8.3896E−03 | 2.5020E−03 | −3.9017E−04 | −4.0812E−05 |
| R4 | −1.3280E+00 | −1.2988E−01 | −1.3407E−02 | −1.4924E−03 | 1.5460E−03 | 1.6365E−03 | 5.1757E−04 |

Table 10 shows design data of inflection points of each lens in the camera optical lens 40 according to Embodiment 4 of the present disclosure.

TABLE 10

|  | Number of inflection points | Inflection point position 1 |
| --- | --- | --- |
| P2R1 | 1 | 1.175 |

13

14

Figure 14:
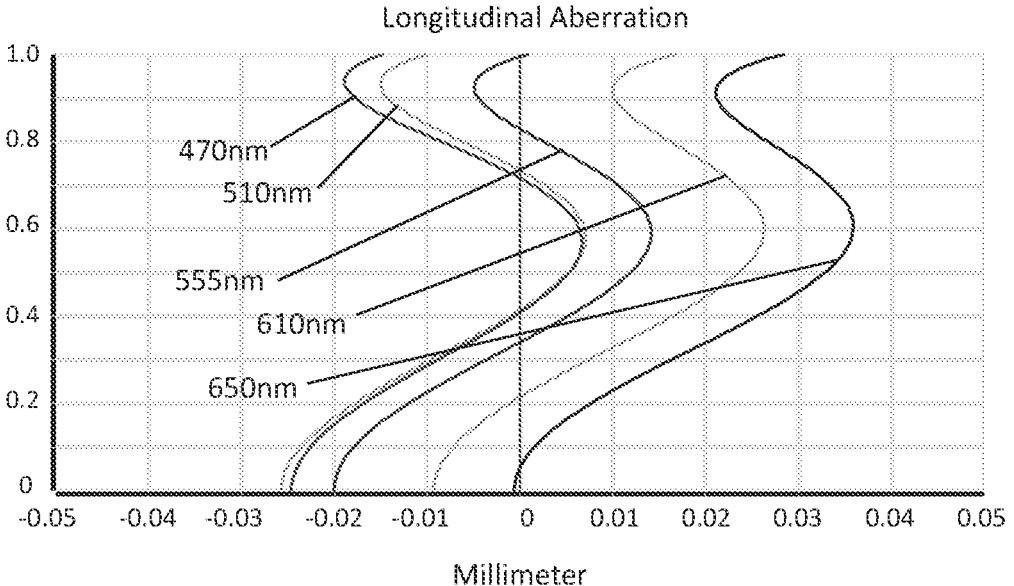
FIG. 14 is a schematic diagram of longitudinal aberration of the camera optical lens shown in FIG. 13.
Figure 15:
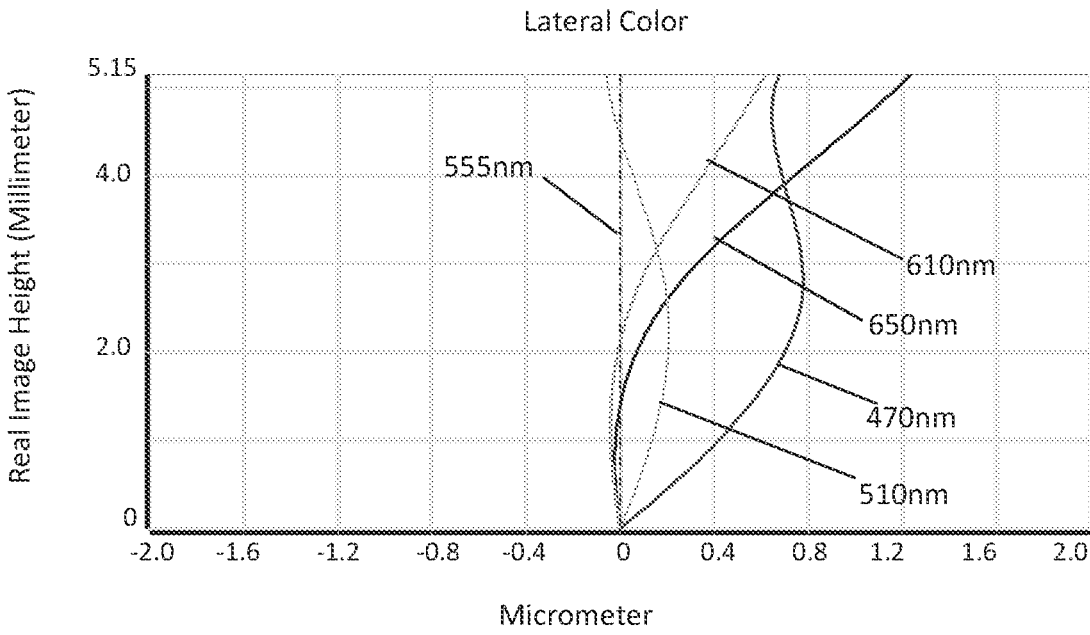
FIG. 15 is a schematic diagram of lateral color of the camera optical lens shown in FIG. 13.
Figure 16:
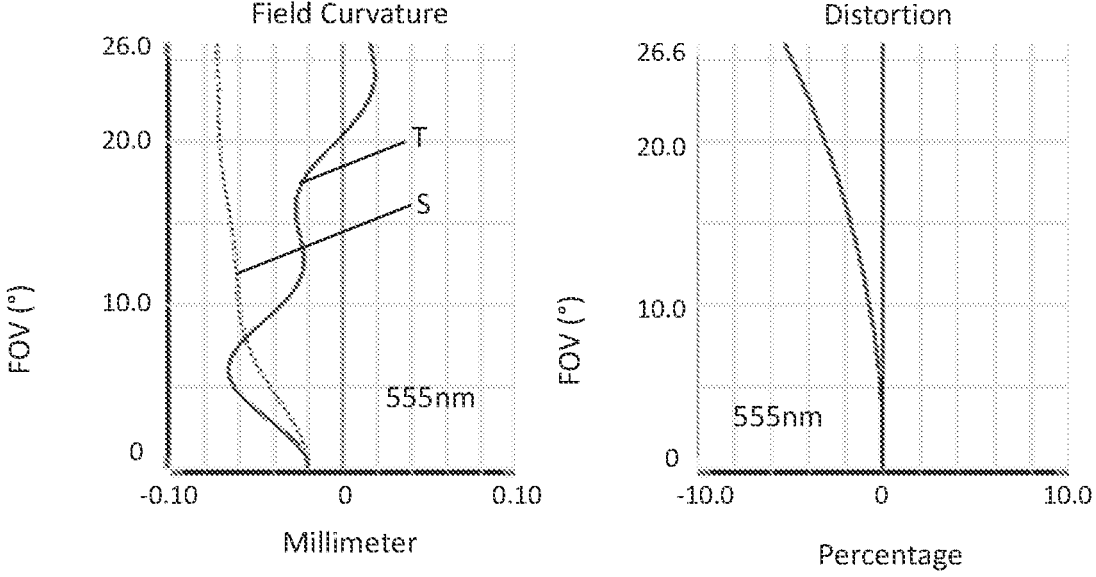
FIG. 16 is a schematic diagram of field curvature and distortion of the camera optical lens shown in FIG. 13.

FIG. 14 and FIG. 15 respectively show longitudinal aberration and lateral color of light with wavelengths of 650 nm, 610 nm, 555 nm, 510 nm, 470 nm, and 435 nm after passing through the camera optical lens 40 according to Embodiment 4. FIG. 16 shows field curvature and distortion of light with a wavelength of 555 nm after passing through the camera optical lens 40 according to Embodiment 4. The field curvature S in FIG. 16 is the field curvature in a sagittal direction, and T is the field curvature in a meridian direction.

The following Table 16 lists values corresponding to each relational expression in this embodiment according to the above relational expressions. It is apparent that, the camera optical lens 40 of the present embodiment satisfies the above relational expressions.

In this embodiment, the entrance pupil diameter ENPD of the camera optical lens 40 is 2.150 mm, the full field of view image height IH is 5.145 mm, and the field of view FOV in a diagonal direction is 52.01°, the camera optical lens 40 has good optical performance, its on-axis and off-axis chromatic aberrations are fully corrected.

Embodiment 5

Embodiment 5 is substantially the same as Embodiment 1, and the reference signs have the same meaning as Embodiment 1, and only differences are listed below.

Figure 17:
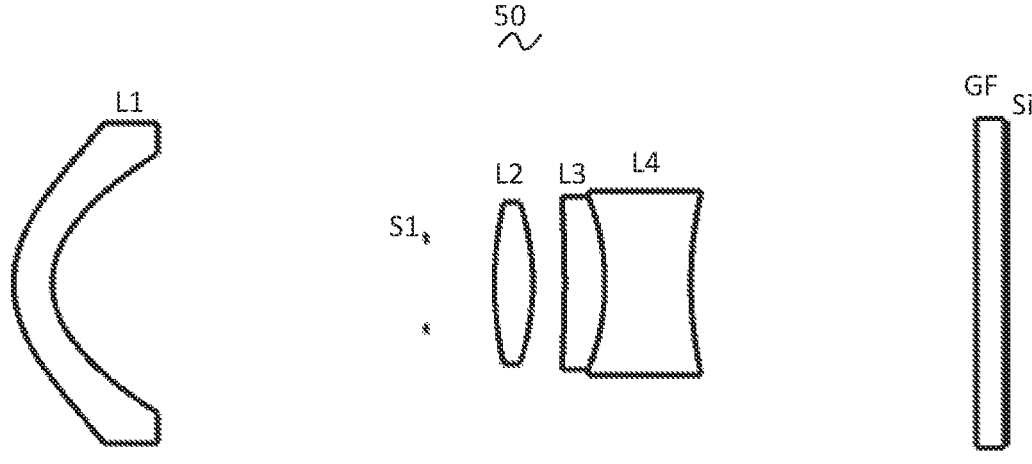
FIG. 17 is a structural schematic diagram of a camera optical lens according to Embodiment 5 of the present disclosure.

FIG. 17 shows a camera optical lens 50 according to Embodiment 5 of the present disclosure.

Table 11 and Table 12 show design data of the camera optical lens 50 according to Embodiment 5 of the present disclosure.

TABLE 11

|  | R |  | d |  | nd |  | vd |
| --- | --- | --- | --- | --- | --- | --- | --- |
| S1 | ∞ | d0= | −12.836 |  |  |  |  |
| R1 | 3.722 | d1= | 1.200 | nd1 | 1.4969 | v1 | 81.52 |
| R2 | 2.609 | d2= | 13.752 |  |  |  |  |
| R3 | 10.850 | d3= | 1.197 | nd2 | 1.6192 | v2 | 63.85 |
| R4 | −7.949 | d4= | 0.983 |  |  |  |  |
| R5 | −42.796 | d5= | 1.252 | nd3 | 1.8040 | v3 | 46.57 |
| R6 | −7.443 | d6= | 0.000 |  |  |  |  |
| R7 | −7.443 | d7= | 2.682 | nd4 | 1.6989 | v4 | 30.05 |
| R8 | 13.315 | d8= | 8.857 |  |  |  |  |
| R9 | ∞ | d9= | 0.900 | ndg | 1.5168 | vg | 64.21 |
| R10 | ∞ | d10= | 0.081 |  |  |  |  |

Table 12 shows aspheric surface data of each lens in the camera optical lens 50 according to Embodiment 5 of the present disclosure.

TABLE 12

| | Conic Coefficient | Aspheric Coefficient | | | | | |
| --- | --- | --- | --- | --- | --- | --- | --- |
| | k | A4 | A6 | A8 | A10 | A12 | A14 |
| R1 | −5.6640E−01 | −7.1057E−01 | −6.6071E−02 | 1.4871E−03 | −4.8545E−04 | −1.4807E−04 | −3.8035E−05 |
| R2 | −6.5727E−01 | −3.6396E−01 | −4.3189E−02 | −4.6042E−04 | −4.4970E−04 | 5.0097E−05 | −6.6317E−05 |
| R3 | −2.5186E+00 | 1.3698E−03 | 1.6963E−03 | −1.7018E−03 | −1.8247E−03 | −6.3129E−04 | −3.1033E−04 |
| R4 | −3.2566E+00 | −8.7465E−03 | 3.1666E−03 | −2.5446E−03 | −2.7524E−03 | −1.0722E−03 | −3.9034E−04 |

Table 13 show design data of inflection points and arrest points of each lens in the camera optical lens 50 according to the Embodiment 5 of the present disclosure.

TABLE 13

|  | Number of inflection points | Inflection point position 1 | Inflection point position 2 |
| --- | --- | --- | --- |
| P1R1 | 2 | 4.245 | 5.065 |

Figure 18:
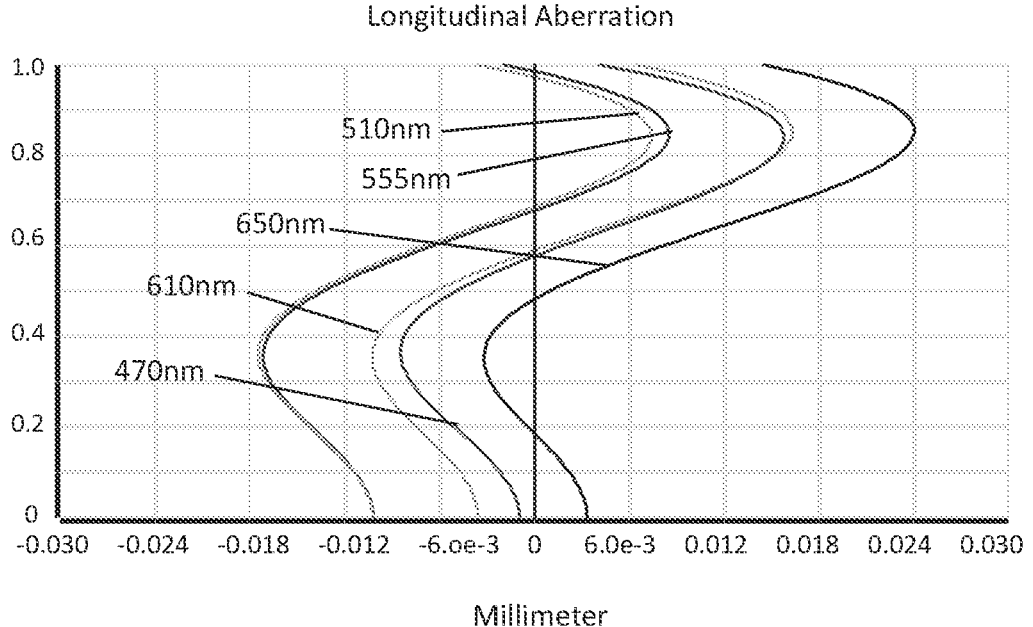
FIG. 18 is a schematic diagram of longitudinal aberration of the camera optical lens shown in FIG. 17.
Figure 19:
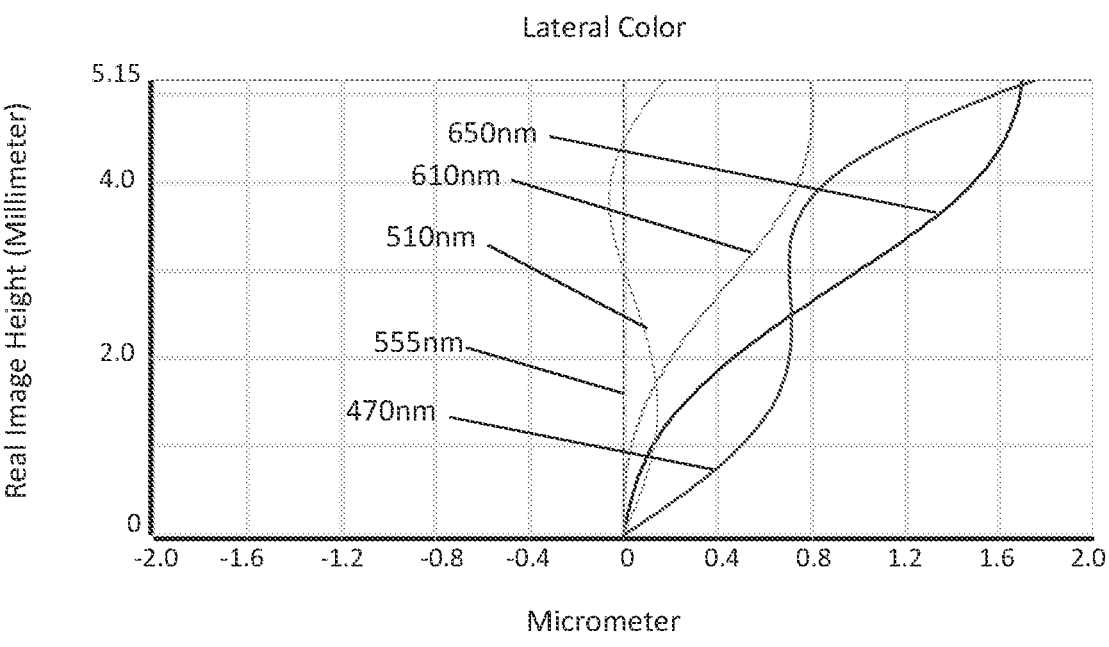
FIG. 19 is a schematic diagram of lateral color of the camera optical lens shown in FIG. 17.
Figure 20:
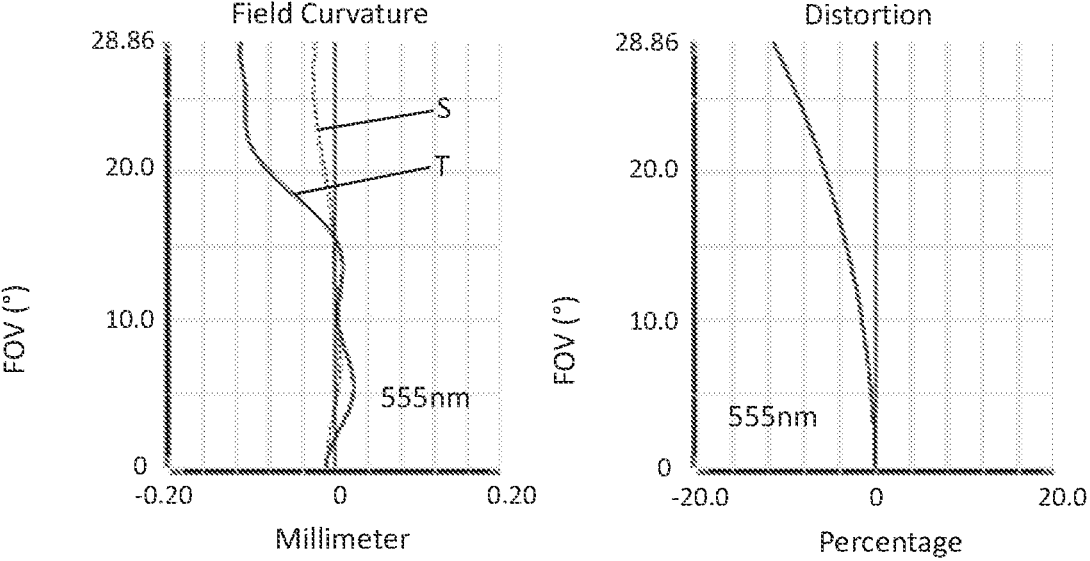
FIG. 20 is a schematic diagram of field curvature and distortion of the camera optical lens shown in FIG. 17.

FIG. 18 and FIG. 19 respectively show longitudinal aberration and lateral color of light with wavelengths of 650 nm, 610 nm, 555 nm, 510 nm, 470 nm, and 435 nm after passing through the camera optical lens 50 according to Embodiment 5. FIG. 20 shows field curvature and distortion of light with a wavelength of 555 nm after passing through the camera optical lens 50 according to Embodiment 5. The field curvature S in FIG. 20 is the field curvature in a sagittal direction, and T is the field curvature in a meridian direction.

The following Table 16 lists values corresponding to each relational expression in this embodiment according to the above relational expressions. It is apparent that, the camera optical lens 50 of the present embodiment satisfies the above relational expressions.

In this embodiment, the entrance pupil diameter ENPD of the camera optical lens 50 is 2.037 mm, the full field of view image height IH is 5.145 mm, and the field of view FOV in a diagonal direction is 57.72°, the camera optical lens 50 has good optical performance, its on-axis and off-axis chromatic aberrations are fully corrected.

Comparative Embodiment

The Comparative Embodiment is basically the same as Embodiment 1, the reference sign meaning is the same as that of Embodiment 1, and only differences are listed below.

Figure 21:
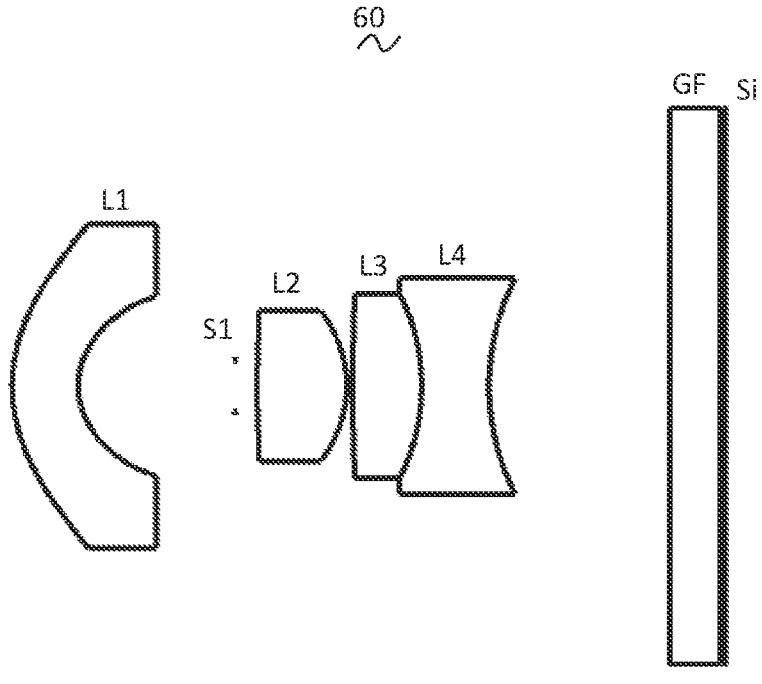
FIG. 21 is a schematic structural diagram of a camera optical lens according to Comparative Embodiment.

FIG. 21 shows a camera optical lens 60 according to Comparative Embodiment.

Table 14 and Table 15 show design data of the camera optical lens 60 according to Comparative Embodiment.

TABLE 14

|  | R |  | d |  | nd |  | vd |
| --- | --- | --- | --- | --- | --- | --- | --- |
| S1 | ∞ | d0= | −3.984 |  |  |  |  |
| R1 | 3.146 | d1= | 1.176 | nd1 | 1.4969 | v1 | 81.52 |
| R2 | 1.482 | d2= | 3.193 |  |  |  |  |
| R3 | 16.006 | d3= | 1.605 | nd2 | 1.6192 | v2 | 63.85 |
| R4 | −2.237 | d4= | 0.100 |  |  |  |  |
| R5 | 38.558 | d5= | 1.234 | nd3 | 1.8040 | v3 | 46.57 |
| R6 | −4.004 | d6= | 0.000 |  |  |  |  |
| R7 | −4.004 | d7= | 1.200 | nd4 | 1.6989 | v4 | 30.05 |
| R8 | 4.630 | d8= | 3.229 |  |  |  |  |
| R9 | ∞ | d9= | 0.900 | ndg | 1.5168 | vg | 64.21 |
| R10 | ∞ | d10= | 0.081 |  |  |  |  |

Table 15 shows aspheric surface data of each lens in the camera optical lens 60 according to Comparative Embodiment.

TABLE 15

| | Conic Coefficient | Aspheric Coefficient | | | | | |
|---|---|---|---|---|---|---|---|
| | k | A4 | A6 | A8 | A10 | A12 | A14 |
| R1 | −2.9614E+00 | 1.3524E+00 | 6.8543E+00 | −4.0169E+01 | 6.4610E+01 | 1.1290E+01 | −1.3935E+02 |
| R2 | −3.4639E−01 | −3.5794E−01 | −2.3537E−01 | −2.2609E−01 | 3.8640E−01 | 9.3678E−02 | −3.9791E−01 |
| R3 | −6.2359E+01 | −1.2657E−01 | 1.1992E+00 | −7.4578E+00 | 1.8212E+01 | 1.4857E−01 | −8.4729E+01 |
| R4 | −7.1719E−01 | −2.1325E−02 | 6.8315E−02 | −1.3955E−01 | 1.4665E−01 | 8.2678E−03 | −1.7001E−01 |

| | Conic Coefficient | Aspheric Coefficient | | |
|---|---|---|---|---|
| | k | A16 | A18 | A20 |
| R1 | −2.9614E+00 | 1.1151E+02 | 4.2426E+01 | −8.7395E+01 |
| R2 | −3.4639E−01 | −1.2606E−03 | 4.8476E−01 | −4.3621E−01 |
| R3 | −6.2359E+01 | 1.5728E+02 | 1.8402E+02 | −1.1361E+03 |
| R4 | −7.1719E−01 | 1.2619E−01 | 2.2116E−02 | −6.4356E−02 |

Figure 22:
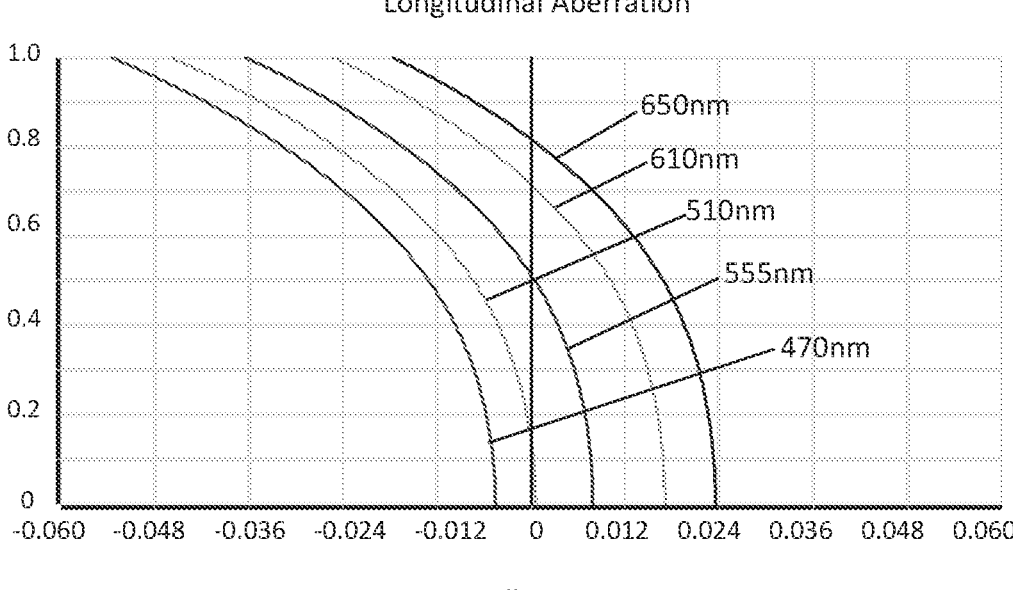
FIG. 22 is a schematic diagram of longitudinal aberration of the camera optical lens shown in FIG. 21.
Figure 23:
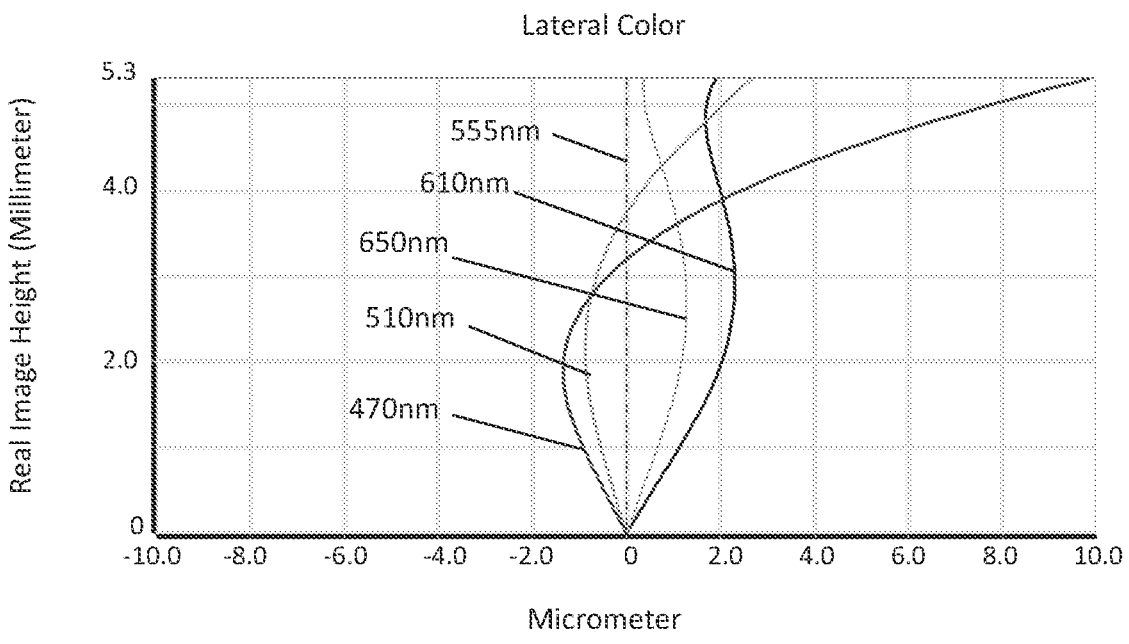
FIG. 23 is a schematic diagram of lateral color of the camera optical lens shown in FIG. 21.
Figure 24:
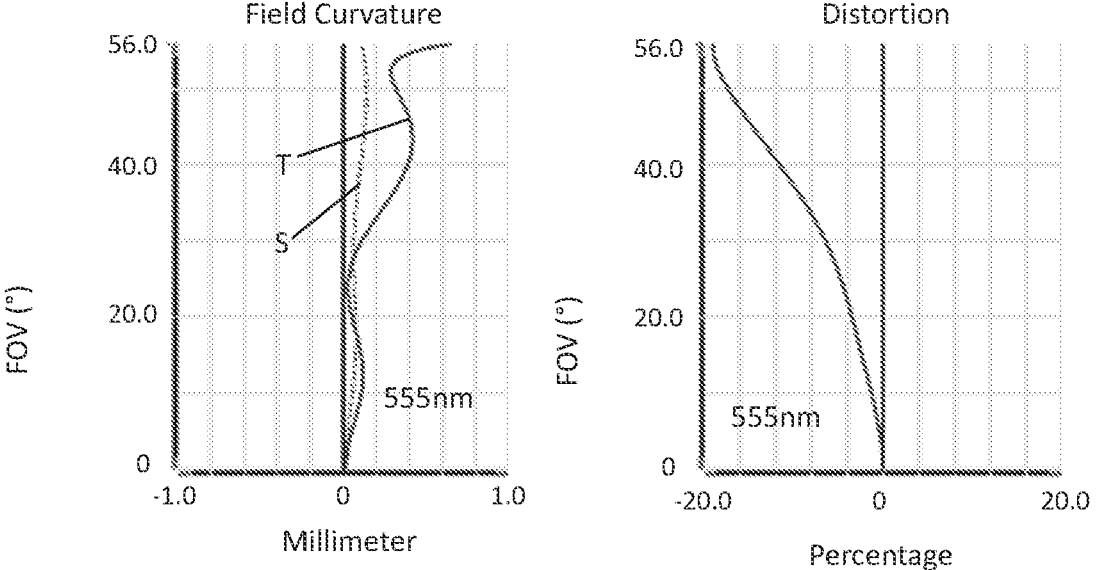
FIG. 24 is a schematic diagram of field curvature and distortion of the camera optical lens shown in FIG. 21.

FIG. 22 and FIG. 23 respectively show longitudinal aberration and lateral color of light with wavelengths of 650 nm, 610 nm, 555 nm, 510 nm, 470 nm, and 435 nm after passing through the camera optical lens 60 according to Comparative Embodiment. FIG. 24 shows field curvature and distortion of light with a wavelength of 555 nm after passing through the camera optical lens 60 according to Comparative Embodiment. The field curvature S in FIG. 24 is the field curvature in a sagittal direction, and T is the field curvature in a meridian direction.

In this embodiment, the entrance pupil diameter ENPD of the camera optical lens 60 is 0.739 mm, the full field of view image height IH is 5.145 mm, and the field of view FOV in a diagonal direction is 110.33°.

Table 16 below lists values corresponding to each relational expression in Comparative Embodiment according to the above relational expressions. It is apparent that, the camera optical lens 60 of Comparative Embodiment does not satisfy the above relational expression −30.00≤f1/d1≤−8.00, and the chromatic aberration cannot be improved.

third lens having a positive refractive power, and a fourth lens having a negative refractive power;
  wherein a focal length of the camera optical lens is f, a focal length of the first lens is f1, a combined focal length of the third lens and the fourth lens is f34, an on-axis thickness of the first lens is d1, an on-axis distance from an image-side surface of the first lens to an object-side surface of the second lens is d2, a total optical length from the object-side surface of the first lens to an image plane of the camera optical lens along an optic axis of the camera optical lens is TTL, an abbe number of the first lens is v1, and following relational expressions are satisfied:

$$-30.00 \le f1/d1 \le -8.00;$$

$$2.00 \le TTL/f \le 3.00;$$

$$-2.30 \le f34/f < -1.30;$$

TABLE 16

| Parameters and Relational Expressions | Embodiment 1 | Embodiment 2 | Embodiment 3 | Embodiment 4 | Embodiment 5 | Comparative Embodiment |
|---|---|---|---|---|---|---|
| f1/d1 | −17.24 | −29.56 | −8.10 | −18.53 | −22.78 | −6.25 |
| TTL/f | 2.558 | 2.010 | 2.969 | 2.383 | 2.934 | 2.869 |
| f34/f | −1.843 | −1.420 | −2.300 | −1.525 | −1.621 | −2.298 |
| v1 | 81.522 | 81.522 | 81.522 | 58.961 | 81.522 | 81.522 |
| d2/TTL | 0.382 | 0.315 | 0.252 | 0.310 | 0.445 | 0.251 |
| R3/R4 | −1.478 | −1.006 | −1.779 | −5.971 | −1.365 | −7.154 |
| f4/d7 | −2.242 | −1.510 | −1.538 | −2.970 | −2.403 | −2.407 |
| f | 11.344 | 12.889 | 11.787 | 11.118 | 10.532 | 0.778 |
| f1 | −26.450 | −35.465 | −19.015 | −26.736 | −27.339 | −5.209 |
| f2 | 7.621 | 7.567 | 8.596 | 6.996 | 7.573 | −2.116 |
| f3 | 9.857 | 11.803 | 9.243 | 13.870 | 10.988 | 2.298 |
| f4 | −6.720 | −6.995 | −6.754 | −7.338 | −6.446 | −1.247 |
| FNO | 5.170 | 5.170 | 15.950 | 5.171 | 5.170 | 5.999 |
| TTL | 30.000 | 25.906 | 34.996 | 26.490 | 30.904 | 12.718 |

Those skilled in the art can understand that the above embodiments are specific embodiments for implementing the present disclosure, and in practical applications, various changes may be made in form and detail without departing from the spirit and scope of the present disclosure.

What is claimed is:
  1. A camera optical lens, comprising from an object-side to an image-side: a first lens having a negative refractive power, a second lens having a positive refractive power, a

-continued $$58.00 \le v1 \le 82.00; \text{ and}$$

$$0.25 \le d2/TTL \le 0.45.$$

2. The camera optical lens as described in claim 1, wherein a central curvature radius of an object-side surface of the second lens is R3, a central curvature radius of an image-side surface of the second lens is R4, and a following relational expression is satisfied:

$$-6.00 \leq R3/R4 \leq -1.00.$$

3. The camera optical lens as described in claim 1, wherein a focal length of the fourth lens is f4, an on-axis thickness of the fourth lens is d7, and a following relational expression is satisfied:

$$-3.00 \leq d4/d7 \leq -1.50.$$

4. The camera optical lens as described in claim 1, wherein an object-side surface of the first lens is convex in a paraxial region, and an image-side surface of the first lens is concave in the paraxial region;

a central curvature radius of an object-side surface of the first lens is R1, and a central curvature radius of the image-side surface of the first lens is R2, and following relational expressions are satisfied:

$$-5.50 \leq f1/f \leq -1.08;$$

$$1.77 \leq (R1 + R2)/(R1 - R2) \leq 10.09;\ and$$

$$0.02 \leq d1/TTL \leq 0.10.$$

5. The camera optical lens as described in claim 1, wherein an object-side surface of the second lens is convex in a paraxial region, and an image-side surface of the second lens is convex in the paraxial region;

a focal length of the second lens is f2, a central curvature radius of an object-side surface of the second lens is R3, a central curvature radius of an image-side surface of the second lens is R4, an on-axis thickness of the second lens is d3, and following relational expressions are satisfied:

$$0.29 \leq f2/f \leq 1.09;$$

$$0 \leq (R3 + R4)/(R3 - R4) \leq 1.07;\ and$$

$$0.02 \leq d3/TTL \leq 0.31.$$

6. The camera optical lens as described in claim 1, wherein an object-side surface of the third lens is concave in a paraxial region, and an image-side surface of the third lens is convex in the paraxial region;

a focal length of the third lens is f3, a central curvature radius of an object-side surface of the third lens is R5, a central curvature radius of an image-side surface of the third lens is R6, an on-axis thickness of the third lens is d5, and following relational expressions are satisfied:

$$0.39 \leq f3/f \leq 1.87;$$

$$0.65 \leq (R5 + R6)/(R5 - R6) \leq 2.73;\ and$$

$$0.02 \leq d5/TTL \leq 0.09.$$

7. The camera optical lens as described in claim 1, wherein an object-side surface of the fourth lens is concave in a paraxial region, and an image-side surface of the fourth lens is concave in the paraxial region;

a focal length of the fourth lens is f4, a central curvature radius of an object-side surface of the fourth lens is R7, a central curvature radius of an image-side surface of the fourth lens is R8, and an on-axis thickness of the fourth lens is d7, and following relational expressions are satisfied:

$$-1.32 \leq f4/f \leq -0.36;$$

$$-1.31 \leq (R7 + R8)/(R7 - R8) \leq -0.06;\ and$$

$$0.04 \leq d7/TTL \leq 0.27.$$

8. The camera optical lens as described in claim 1, wherein the first lens, the second lens, the third lens and the fourth lens are made of glass.

9. The camera optical lens as described in claim 8, wherein a field of view in a diagonal direction of the camera optical lens is FOV, and a following relational expression is satisfied:

FOV≥46.18°.

10. The camera optical lens as described in claim 1, wherein an image height of the camera optical lens is IH, and a following relational expression is satisfied:

$$TTL/IH \leq 7.14.$$

* * * * *